United States Patent
Celebi et al.

(10) Patent No.: US 10,327,197 B2
(45) Date of Patent: Jun. 18, 2019

(54) DISTRIBUTED CLUSTERING OF WIRELESS NETWORK NODES

(71) Applicant: QUALCOMM Incorporated, San Diego, CA (US)

(72) Inventors: Samel Celebi, Summit, NJ (US); Soumya Das, San Diego, CA (US); Insoo Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/170,408

(22) Filed: Jan. 31, 2014

(65) Prior Publication Data

US 2015/0223143 A1    Aug. 6, 2015

(51) Int. Cl.
*H04W 40/32*    (2009.01)
*H04W 24/02*    (2009.01)

(52) U.S. Cl.
CPC ........... *H04W 40/32* (2013.01); *H04W 24/02* (2013.01)

(58) Field of Classification Search
CPC ............................. H04W 40/32; H04W 24/02
See application file for complete search history.

(56) References Cited

U.S. PATENT DOCUMENTS

| | | | |
|---|---|---|---|
| 2003/0053424 A1* | 3/2003 | Krishnamurthy .. | H04B 7/18563 370/316 |
| 2004/0017783 A1* | 1/2004 | Szentesi ............... | H04Q 3/0016 370/256 |
| 2005/0120105 A1* | 6/2005 | Popescu ................. | H04L 41/00 709/223 |
| 2010/0011244 A1* | 1/2010 | Mohamed-Rasheed ...................... | H04L 45/04 714/18 |

(Continued)

FOREIGN PATENT DOCUMENTS

| CN | 101305348 A | 11/2008 |
|---|---|---|
| CN | 101573924 A | 11/2009 |

(Continued)

OTHER PUBLICATIONS

Dressler F., "Clustering" In: "Self-Organization in Sensor and Actor Networks", Nov. 16, 2007 (Nov. 16, 2007), John Wiley & Sons, Ltd, Chichester, UK, XP055180067, ISBN: 978-0-47-002820-9, pp. 185-202, DOI: 10.1002/9780470724460. ch12.

(Continued)

*Primary Examiner* — Said M Elnoubi
(74) *Attorney, Agent, or Firm* — Arent Fox, LLP

(57) ABSTRACT

In one or more access points of a wireless communication network, a method for participating in a distributed clustering process directed at defining clusters of access points wherein each of the clusters comprises a cluster head and associated member nodes includes determining a marginal (Continued)

cost of associating an access point to each of distinct clusters of access points, based on a defined cost function, and associating the access point to one of the clusters of APs for which the marginal cost is minimized. The method may be performed by multiple access points in a peer-to-peer fashion and iterated until a stable cluster configuration is obtained. A cluster head may similarly be appointed in a distributed fashion by a current cluster head comparing total cost functions between different cluster configurations with different cluster heads.

28 Claims, 13 Drawing Sheets

(56) References Cited

U.S. PATENT DOCUMENTS

| | | | |
|---|---|---|---|
| 2011/0188378 A1* | 8/2011 | Collins | H04L 41/042 370/236 |
| 2013/0039206 A1 | 2/2013 | Borran et al. | |
| 2013/0077494 A1 | 3/2013 | Samdanis | |
| 2013/0079024 A1 | 3/2013 | Procopiuc et al. | |
| 2013/0138792 A1* | 5/2013 | Preden | H04W 52/0216 709/223 |
| 2013/0179487 A1 | 7/2013 | Lubetzky et al. | |
| 2013/0201876 A1 | 8/2013 | Martin | |
| 2013/0242748 A1 | 9/2013 | Mangalvedhe et al. | |
| 2014/0372807 A1* | 12/2014 | Poola | G06F 11/3452 714/39 |

FOREIGN PATENT DOCUMENTS

| | | |
|---|---|---|
| CN | 102300229 A | 12/2011 |
| CN | 102907052 A | 1/2013 |
| CN | 103167586 A | 6/2013 |
| CN | 103415058 A | 11/2013 |
| JP | 2005515695 A | 5/2005 |
| JP | 2012124887 A | 6/2012 |
| JP | 2013543688 A | 12/2013 |

OTHER PUBLICATIONS

International Search Report and Written Opinion—PCT/US2015/013331—ISA/EPO—dated Apr. 10, 2015.

Renesas Mobile Europe Ltd: "Cell-Clustering in Rel-12 Deployment Scenarios", 3GPP Draft; R1-133239, 3rd Generation Partnership Project (3GPP), Mobile Competence Centre; 650, Route Des Lucioles; F-06921 Sophia-Antipolis Cedex; France, vol. RAN WG1, no. Barcelona, Spain; Aug. 19, 2013-Aug. 23, 2013, Aug. 9, 2013 (Aug. 9, 2013), pp. 1-12, XP050716055, Retrieved from the Internet: URL:http://www.3gpp.org/ftp/tsg_ran/WG1_RL1/TSGR1_74/Docs/ [retrieved on Aug. 9, 2013].

Zhou X., et al., "Game-theoretical frequency reuse method for complex cognitive femto-cell network", 2013 8th International Conference on Communications and Networking in China (CHINACOM), IEEE, Aug. 14, 2013 (Aug. 14, 2013), pp. 318-322, XP032546802, DOI: 10.1109/CHINACOM.2013.6694613 [retrieved on Dec. 24, 2013].

\* cited by examiner

DISTRIBUTED CLUSTERING OF WIRELESS NETWORK NODES

BACKGROUND

Aspects of the present disclosure relate generally to wireless communication systems, and more particularly, to apparatus systems and methods for clustering network nodes.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a data service offered on the uplink of UMTS networks.

In heterogeneous cellular wireless systems including base stations of widely varying power, base stations may be broadly categorized as "macro" cells or small cells. Femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 V12.1.0, Section 4 ("Introduction").

Wireless networks have seen increasing addition of small cells. Many small cells are deployed on an ad hoc basis and are interconnected with macrocells making up planned wireless infrastructure. Eventually, such trends may create a need for scalable, distributed control schemes to handle coordination with core networks, for example schemes using a hierarchy of control nodes including small cells. Such schemes may include clusters of small cells at least partly controlled by one of their members. Methods of clustering small cells presently rely on knowledge of network nodes and conditions over multiple clusters at a single control point. Because heterogeneous networks are unplanned, such knowledge may not be readily available. There is therefore a need to enable distributed clustering of wireless nodes without any need to centralize data collection over multiple clusters.

SUMMARY

Methods, apparatus and systems for distributed clustering of network nodes of a wireless communications system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In one or more access points of a wireless communication network, a method for participating in a distributed clustering process directed at defining clusters of access points (APs) wherein each of the clusters comprises a cluster head (CH) and associated member nodes may include, determining a marginal cost of associating an access point to each of distinct clusters of APs, based on a defined cost function. The method may further include associating the access point to one of the clusters of APs for which the marginal cost is minimized.

The method may further include iterating the determining and associating steps until membership, and/or CH identity, of the clusters stabilizes. The method may further include re-initiating the iterating in response to determining a change in cluster state, or in the alternative, periodically re-initiating the iterating.

In other aspects, the method may further include determining, at the access point, whether the access point is designated as a CH. For embodiments wherein the access point is not designated as a CH for a cluster, the method may further include determining, by the access point, whether the access point is associated with any cluster. In such embodiments, the method may further include, in response to determining that the access point is not associated with any cluster, identifying a nearest access point that is associated with a cluster, and associating the access point with the cluster.

In other aspects, determining the marginal cost may include computing a first value of a cost function for a cluster including the access point, a second value of the cost function for the cluster excluding the access point, and computing a difference between the first value and the second value. The cost function may be based on one or more of a frequency of handovers between APs of a cluster, inter-cell interference between the APs of the cluster, path loss between the APs of the cluster, Euclidian distance between the APs of the cluster, and cell loads at APs of the cluster.

In an aspect of the method, the access point may request respective values of the marginal cost from respective ones of the clusters of APs. In addition, the access point may compare the respective values, and associate itself to one of the clusters of APs from which the least of the respective values is received.

In embodiments wherein the access point is designated as a CH for a cluster, the method may further include computing a total cluster cost for respective configurations having different CHs, and appointing a new CH node based on the one of the configurations having the lowest total cost. In such embodiments, the method may further include transferring cluster membership information from the access point to the new CH node. As with the marginal cost function, the total cluster cost may be based on one or more of a frequency of handovers between APs of a cluster, inter-cell interference between the APs of the cluster, path loss between the APs of the cluster, Euclidian distance between the APs of the cluster, and cell loads at APs of the cluster.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network entity, for example, an access point, a picocell, femtocell, Home Node B, or other small cell, or a Node B. In some aspects, several network entities may operate interactively in a peer-to-peer fashion to perform aspects of the technology as described herein. Similarly, an article of manufacture may be provided, including a computer-readable storage medium holding encoded instructions, which when executed by a processor, cause a network entity to perform the methods and aspects of the methods as summarized above.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In an aspect, wireless nodes of a wireless communication system, for example, small cells, are configured with a functionality (e.g., via, hardware, software, firmware, or a combination of the foregoing) to enable distributed (decentralized or self-organizing) clustering of wireless nodes. The distributed clustering methods and apparatus may avoid the need to centralize collection of network information over multiple clusters, enabling efficient, autonomous cluster formation. Distributed (self-organizing) clustering of wireless nodes may be based on comparisons of marginal cost or total cost of a cluster state, wherein marginal cost refers to a change in a cost function caused by an associated change in a cluster membership, and total cost refers to the value of a cost function for an entire cluster in a given state. Cluster state may be determined by parameters such as cluster membership and identity of the node that functions as cluster head.

Figure 1A:
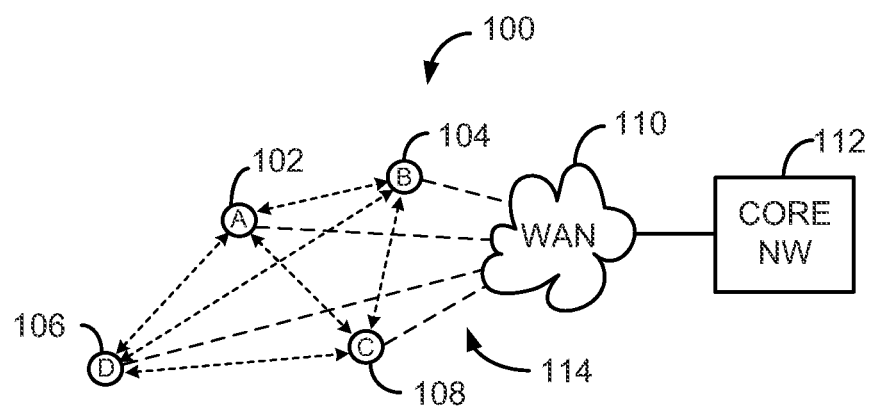
FIGS. 1A-B are block diagrams illustrating aspects of unclustered and clustered nodes, respectively, in a wireless communications system.

In an unclustered system 100 shown in FIG. 1A, each node 102, 104, 106, 108 generally acts independently of its neighbor nodes, although coordination between nodes may be enabled by action of an external node, for example a node of the core network 112. The independent nodes may be in communication with each other via wireless connections, indicated by the double-headed dashed arrows, while being connected via respective backhaul connections 114 to core network components 112 via a wide-area network 110.

Although the nodes 102, 104, 106 and 108 may be linked directly and indirectly in various ways as shown, and/or may be in a radio neighborhood of one another, the set of nodes does not thereby comprise a "cluster." As used herein, a cluster means a set of wireless nodes including at least one head (controlling) node and at least one member (controlled) node, wherein the set is organized according to a defined command structure wherein the operation of each member node of the cluster is controlled at least in part by a parameter set by a cluster head node.

Figure 1B:
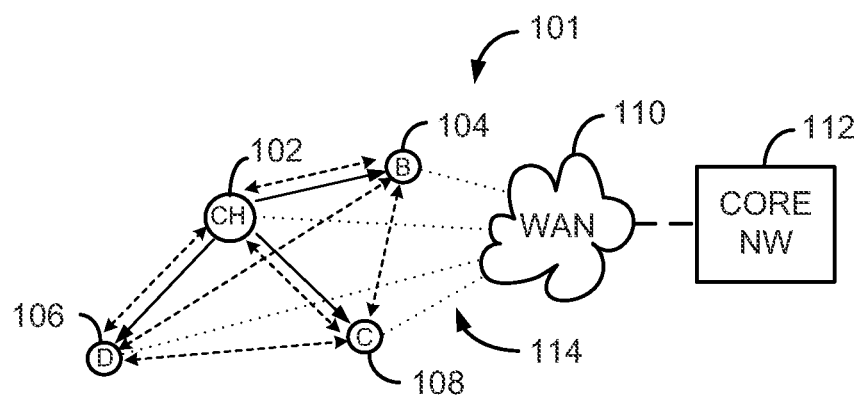

FIG. 1B shows a clustered system 101, identical to system 100 except that node coordination determinations that may have formerly been handled by the core network, or other determinations, are now handled by node 102. The node 102 is the controlling node, also referred to herein as the "cluster head." The other nodes 104, 106 and 108 are the controlled nodes, also referred to as the members of the cluster. Using the cluster head 102 for control purposes may reduce control signal traffic over backhaul links 114 and corresponding overhead required at the core network 112 for making control determinations. It should be appreciated that the control functions of the cluster head with respect to its member nodes may be limited to specified purposes, for example, to coordinating wireless resources for the cluster members. The cluster members may operate autonomously and/or also receive control signals from core network entities, for other purposes.

The present operation concerns methods and apparatus for distributed organization of a cluster and not with details of how a cluster is operated after it is organized. To organize a cluster, it is necessary to designate at least one, or only one, cluster head, and identify member nodes that are controlled at least partly by the cluster head. In the applications described herein, it may be assumed that the nodes are peer entities, for example, all of the nodes may be small cells, and may communicate in a peer-to-peer fashion and/or via the core network.

With the introduction of small cells, the number of access points (APs) in the network are expected to grow exponentially. The surge in the number of APs has a potential to overwhelm the core network. Rather than escalating every decision to a central authority a majority of the actions can be taken at a local level, in a hierarchical order that pushes decisions to lower levels, when possible. Grouping the nodes that share a similar goal, for example, mobility robustness optimization or resource scheduling, into smaller clusters is one way of achieving hierarchical organization at a local level.

A distributed clustering algorithm for use in a heterogeneous network may include certain features. For example, the algorithm may operate in a distributed (de-centralized) manner, such that there is no central authority that organizes the clusters. Instead, the clustering decisions may be made locally. In addition, interaction among the APs may be based on peer-to-peer communications. In another aspect, the clustering algorithm may be adaptive, so that it responds to changes in the system such as the activation or inactivation of APs in a self organized way. In a still further aspect, the algorithm may make use of various similarity (proximity) metrics when forming the clusters, including but not limited to a frequency of handovers between the APs, intercell interference between the APs, pathloss between the APs, Euclidian distance between the APs, and cell loads.

Figure 2:
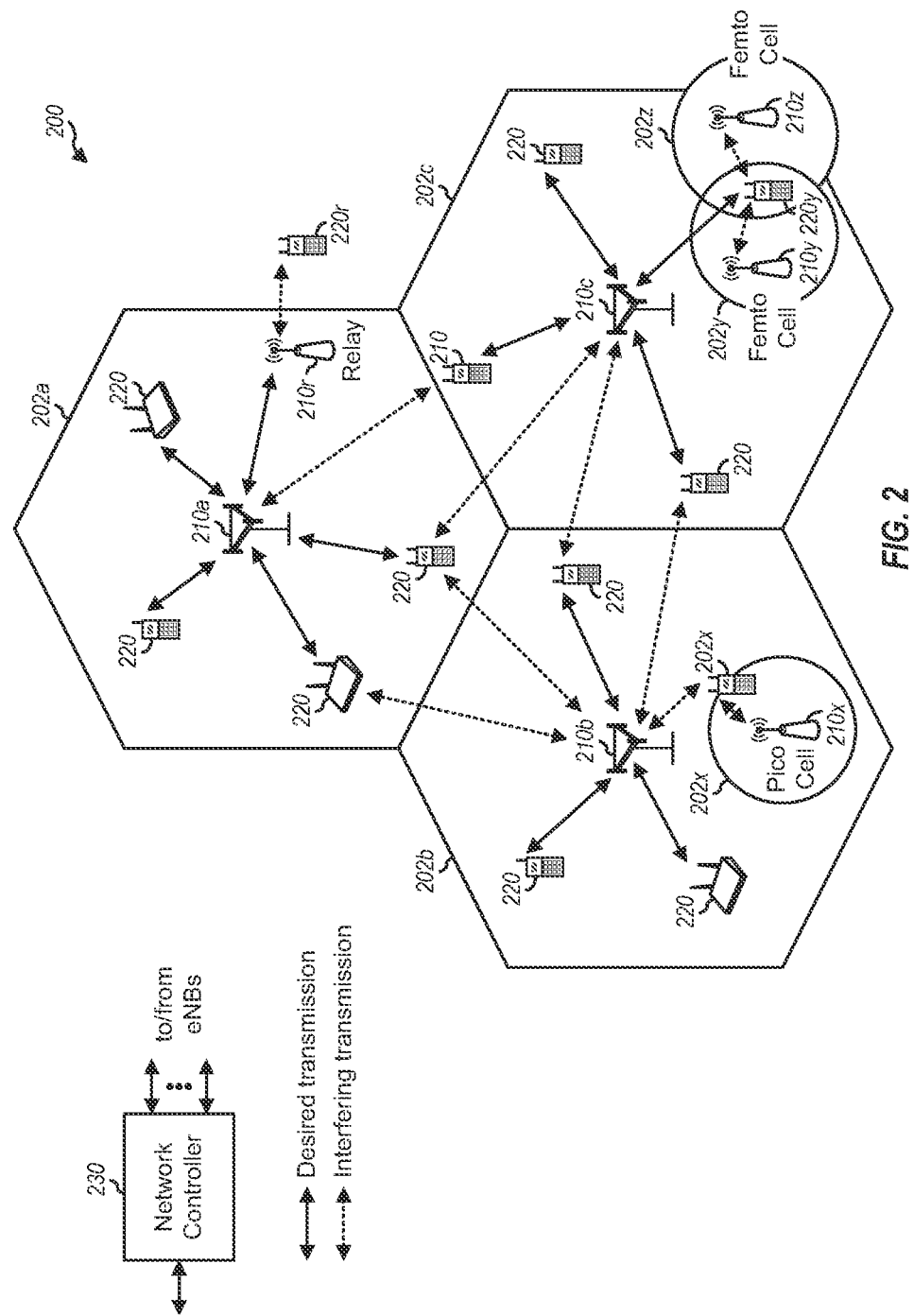
FIG. 2 is a schematic diagram illustrating aspects of a heterogeneous wireless communication system in which distributed clustering may be practiced.

Before describing the methods and apparatus for self-organization of node clusters in more detail, an example of a context in which the present techniques may be practiced may be helpful. FIG. 2 shows a wireless communication network 200, which may be an LTE network. The wireless network 200 may include a number of eNBs 210 and other network entities. An eNB may be a station that communicates with the UEs and may also be referred to as a base station, a Node B, an access point, or other term. Each eNB 210a, 210b, 210c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 2, the eNBs 210a, 210b and 210c may be macro eNBs for the macro cells 202a, 202b and 202c, respectively. The eNB 210x may be a pico eNB for a pico cell 202x. The eNBs 210y and 210z may be femto eNBs for the femto cells 202y and 202z, respectively. An eNB may support one or multiple (e.g., three) cells. The femto cells and pico cells are examples of small cells. As used herein, a small cell means a cell characterized by having a transmit power substantially less than each macro cell in the network with the small cell, for example low-power access points such as defined in 3GPP Technical Report (T.R.) 36.932 section 4.

The wireless network 200 may also include relay stations 210r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 210r may communicate with the eNB 210a and a UE 220r in order to facilitate communication between the eNB 210a and the UE 220r. A relay station may also be referred to as a relay eNB, a relay, etc.

The wireless network 200 may be a heterogeneous network that includes eNBs of different types, e.g., macro eNBs, pico eNBs, femto eNBs, relays, or other base stations. These different types of eNBs may have different transmit power levels, different coverage areas, and different impact on interference in the wireless network 200. For example, macro eNBs may have a high transmit power level (e.g., 5 to 20 Watts) whereas pico eNBs, femto eNBs and relays may have a lower transmit power level (e.g., 0.1 to 2 Watts).

The wireless network 200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 230 may couple to a set of eNBs and provide coordination and control for these eNBs. The network controller 230 may communicate with the eNBs 210 via a backhaul. The eNBs 210 may also communicate with one another, e.g., directly or indirectly via wireless or wireline backhaul. In clusters formed by distributed clustering as described herein, at least a portion of coordination and control for small cell eNB's may be performed by the cluster head, and not by the network controller 230. For example, femto eNB 210y may act as a cluster head for a cluster comprising the femto eNB's 201y, 210z.

The UEs 220 may be dispersed throughout the wireless network 100, and each UE may be stationary or mobile. A UE may also be referred to as a terminal, a mobile station, a subscriber unit, a station, a smart phone, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

A distributed clustering method may include at least the following operations distributed over a set of network nodes 300, as shown in FIGS. 3A-3E. Consider a large heterogenous network of APs 300 that is a mixture of macro, pico and femto stations as depicted in FIG. 1. In FIGS. 3A-3E, each dot represents an AP. APs may be able to carry on peer to peer communication between some or all of their neighbors through a backhaul protocol such as X2 or over the air. The amount of separation between the APs in FIGS. 3A-3E may stand for the physical distances between them, or for some other affinity measure such as, for example, the path loss or the frequency of the handovers between the APs, intercell interference, some similar measure, or a combination of the foregoing measures.

Figure 3A:
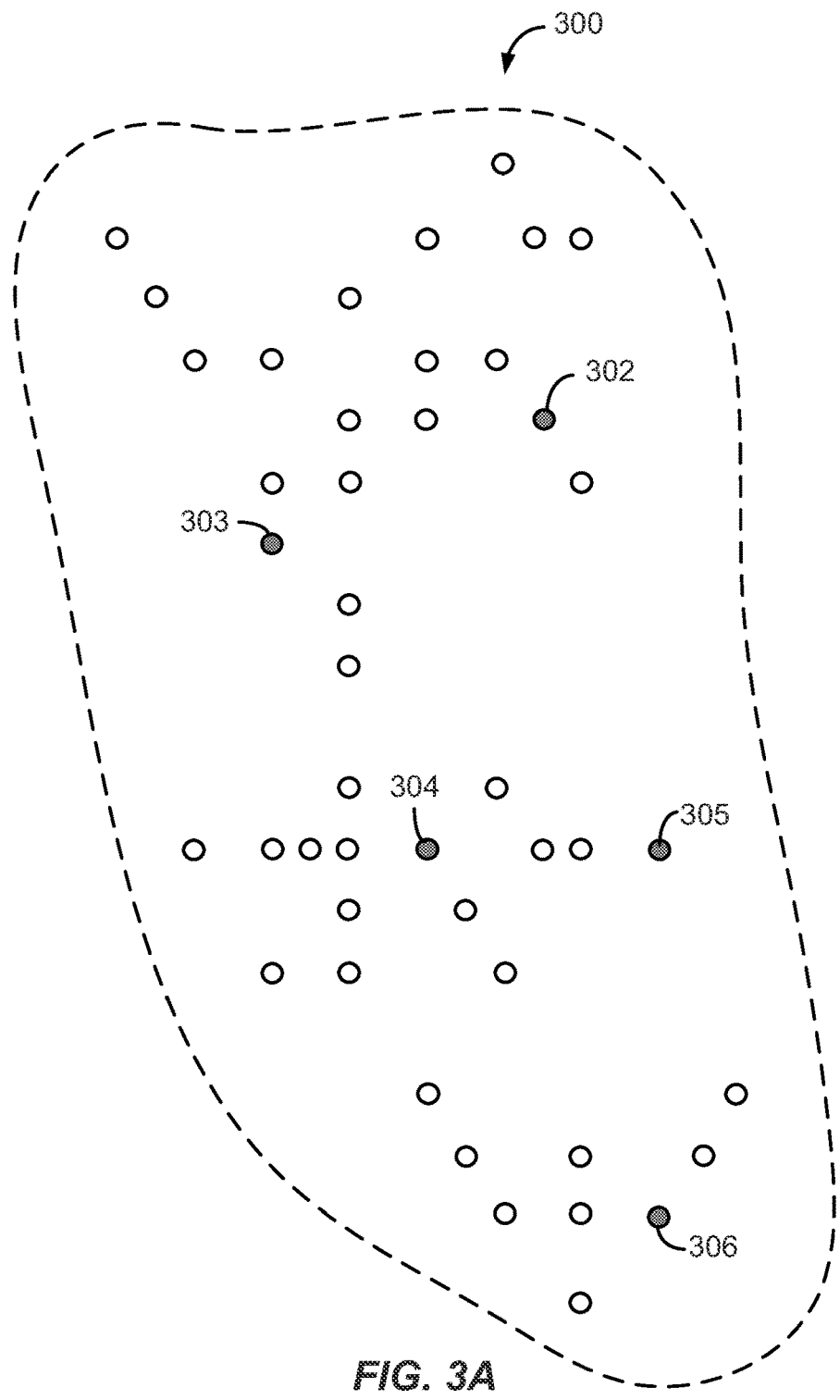
FIGS. 3A-3E are concept diagrams illustrating effects of distributed clustering of network nodes, at successive point in an iterative clustering process.

Initially, as shown in FIG. 3A, a node (e.g., macrocell) designates initial cluster head (CH) nodes 302-306 over a set of nodes 300. In the alternative, the initial cluster heads may be determined using a distributed random process, or a distributed polling process. The CHI nodes may comprise a small percentage of total nodes in the set 300, and once designated, may operate as control nodes of a hierarchical control scheme.

Figure 3B:
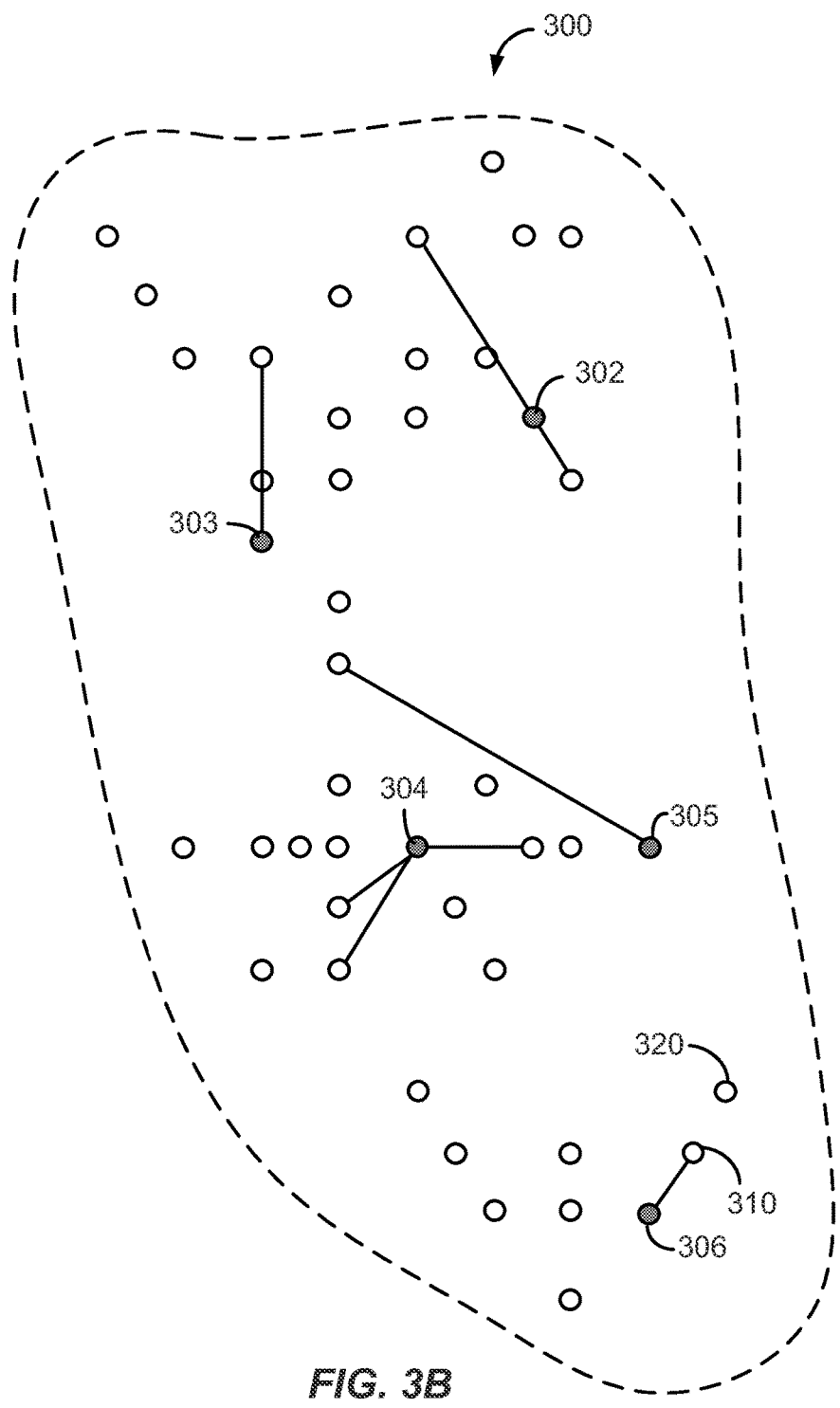

Through neighbor discovery, every node that is not a CH node or cluster member node identifies a nearest neighbor that either is a CH node, or is a member of a cluster controlled by a CH node, and requests to join the cluster. If a node cannot find any neighbor cluster, it may wait and try later, or may operate as a CH node. FIG. 3B shows an early stage of the clustering process, in which the initially designated cluster heads 301-306 have been associated, via operation of the distributed clustering algorithm. The solid lines between the respective cluster heads 301-306 and other nodes in the set of nodes 300 represent these clustering associations.

Each member node may request that a respective one of the CH nodes compute the "marginal cost" of the member node's membership in the CH node's cluster, based on a defined cost function. Various cost functions may be used, including those known in the art. Generally, cost may be computed as an aggregation of factors such as proximity, intercell path loss, frequency of intercell handovers, intercell interference, Euclidean distance, relative cell loading or other. Marginal cost is defined as the cost function for the cluster including the requesting member node, minus the cost function for the cluster omitting the requesting member node.

Each member node, once knowing its own marginal cost, contacts any available neighbor clusters and requests a computation of the marginal cost were it to join each of the neighbor clusters, respectively (the "neighbor marginal cost). If any of the neighbor marginal costs are less than the node's current marginal cost, the node quits its current cluster and joins the cluster having the lowest marginal cost. The foregoing algorithm steps may be iterated until the cluster arrangement converges to a stable solution.

In a separate aspect, each cluster head may compute the total cost of having different members of the cluster as the CH, and appoints the node resulting in the minimum cost, if any, as a new CH node. This process may be iterated until converging to a stable solution. The CH may store information defining members of its cluster in its context memory. If the CH is switched from one cluster member AP to another, such as when the clustering algorithm determines that a different node would make a more optimal cluster head, the context information may also transferred to the new CH.

Any AP that is not associated with a CH node (a "non-associated AP") may be configured to initiate a process of identifying the nearest AP that is associated with a cluster and registers itself with that cluster's head. For example, referring the FIG. 3B, the unassociated AP 320 may contact its nearest neighbor AP to be added to the cluster headed by CH node 310. The information for node 320 may then be added to the CH node's context memory.

Figure 3C:
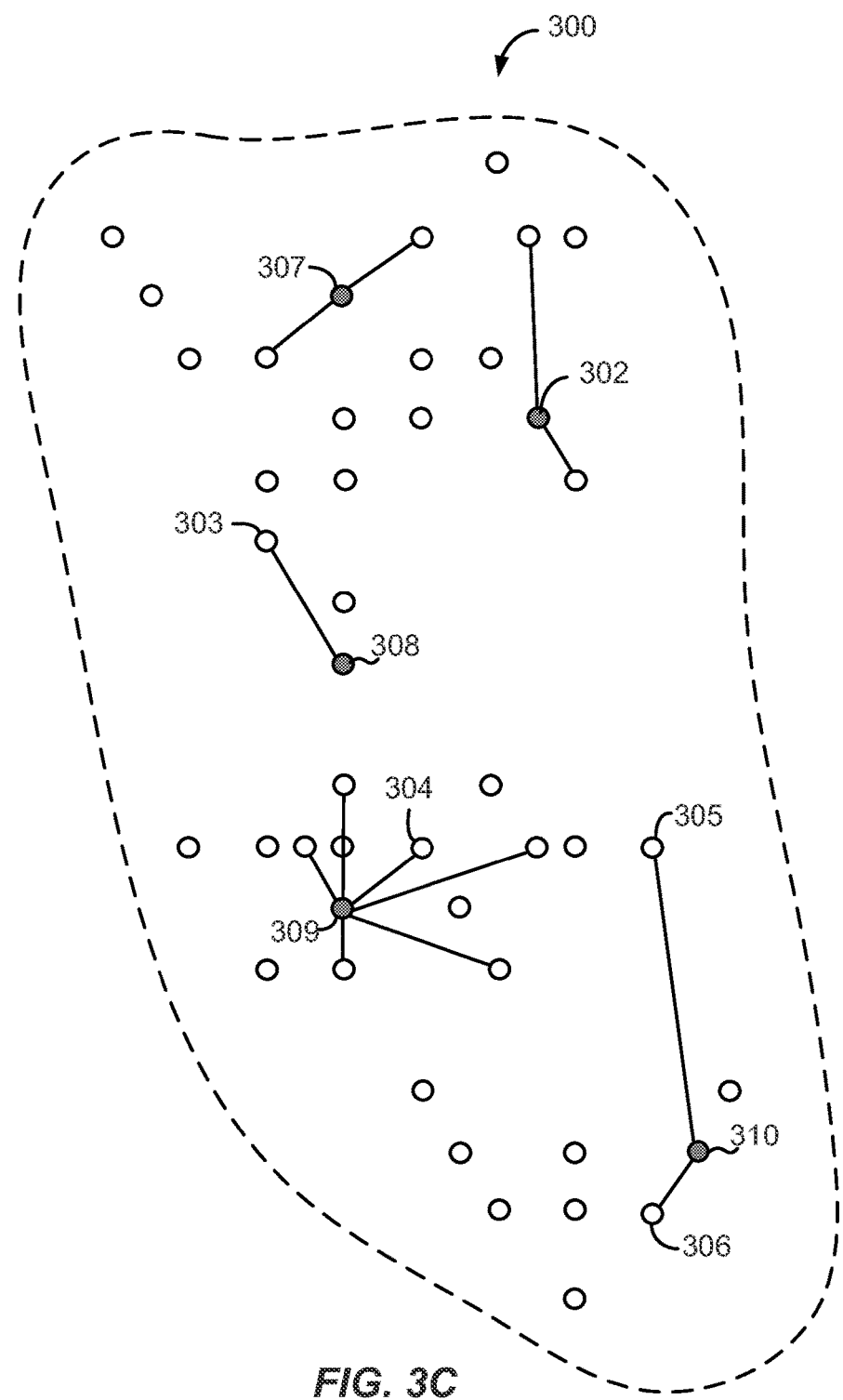
Figure 3D:
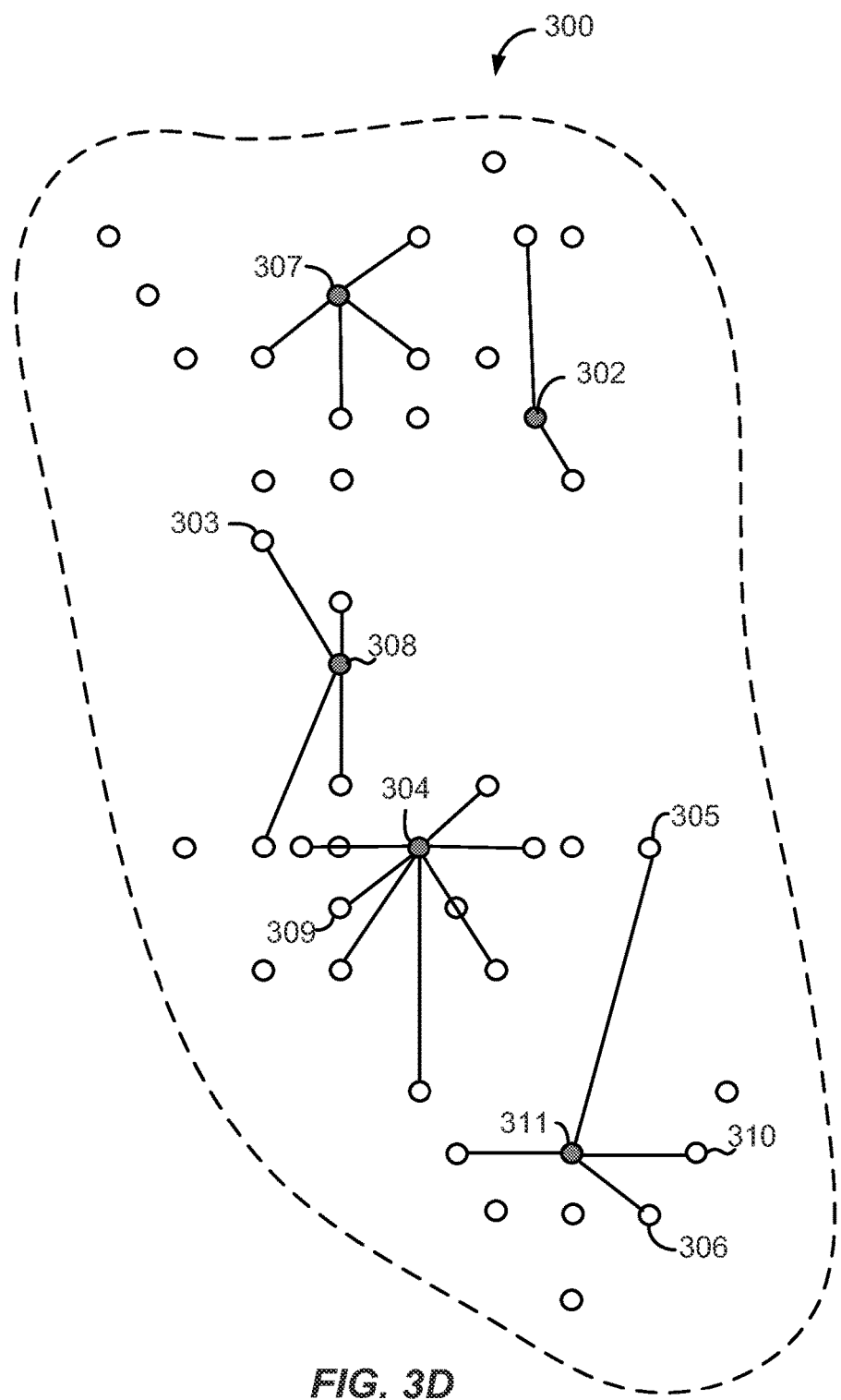
Figure 3E:
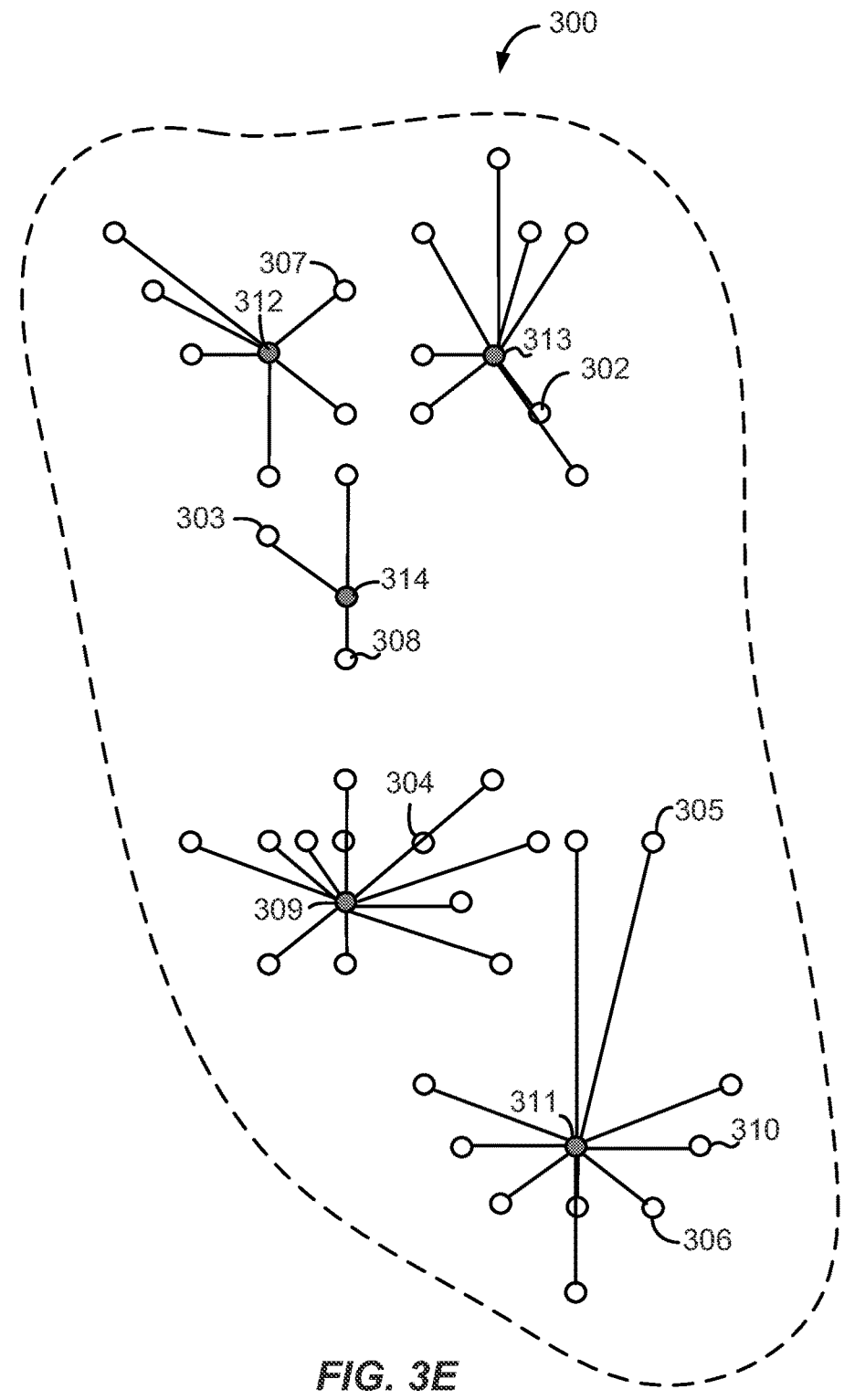

FIG. 3C shows the set 300 at a later point in time after further distributed clustering. The former CH nodes 303, 304, 305, and 306 have relinquished their CH status to new CH nodes 307, 308, 309 and 310. In addition, a greater number of associations have formed between the CH nodes 302, 304, 307, 308 and the remaining members of the set 300, although many node remain unassociated. Subsequently, as shown in FIG. 3D, former CH node 310 has relinquished its CH status to node 311, and the CH status of node 309 has reverted to node 304. The number of associated nodes has increased. Finally, at FIG. 3E, the clustering process for the set 300 has converged to a stable solution. All of the nodes 300 are now associated with a CH. CH status has shifted from former CH nodes 304, 302, and 308 to CH nodes 309, 313, and 314, respectively. The solution may remain stable until the distance function between the nodes or the membership of the set 300 changes.

Various different functions may be used to determine the cost of a cluster membership state. One example is provided below, by which the present technology is not limited. Let '$C_m$' be a cluster with 'N' associated members $ASC_i$ (i=1 . . . N) and let its cluster head be $CH_m=ASC_j$ The cost $\delta(C_m)$ of the cluster is defined as the weighted sum of the distances between the CH and the members, i.e.

$$\delta(C_m, ASC_j) = \sum_{i=1}^{N} w_i \text{dist}(ASC_j - ASC_i)$$

Here, the dist( ) operator refers to a measure of similarity (or dissimilarity). For example for networks dealing with mobility enhancements, the dist( ) operator may yield a small number for APs for which relatively frequent handovers take place, and a very large number when few or no handovers take place between the APs. In other embodiment, the algorithm the operator may represent a pathloss between the two relevant Aps, or any other desired distance measure.

The weights $w_i$ may be operator-defined scaling factors that are used to emphasize or deemphasize the importance of particular APs in the cluster selection. Their choice may depend on various factors—such as the number of users that are served by the AP, the overall load of the AP, or any other desired parameter. The weights may be statically assigned or may be updated in a dynamic fashion.

Periodically, the CH node of each cluster $C_m$ may search among its members $ASC_i$ for a new CH that minimizes the cost function, such as:

$$CH_{new} = \min_{ASC_i} \delta(C_m, ASC_i) \; i = 1 \; \ldots \; N.$$

In addition, the CH of each cluster may periodically, or in response to a defined event, report to individual members $ASC_i$ their marginal costs $\Delta\delta(C_m, CH_m, ASC_i)$ to the cluster. The marginal cost may represent a cost difference between having $ASC_i$ in the cluster and not having it, for example:

$$\Delta\delta(C_m, CH_m, ASC_i) = w_i \text{dist}(CH_m - ASC_i).$$

Each member $ASC_i$ of the cluster $C_m$ may identify the nearest associated access point $ASC_k$ that is a member of another cluster $C_q$ and requests its marginal cost $\Delta\delta(C_q, CH_q, ASC_i)$ to that cluster. If the marginal cost of $ASC_i$ to the new cluster $C_q$ is less than its current cluster, it may switch to that cluster, such as: if $\Delta\delta(C_q, CH_q, ASC_i) < \Delta\delta(C_m, CH_m, ASC_i)$ then $ASC_i$ sends request to $ASC_k$ to join its cluster $C_q$.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 4:
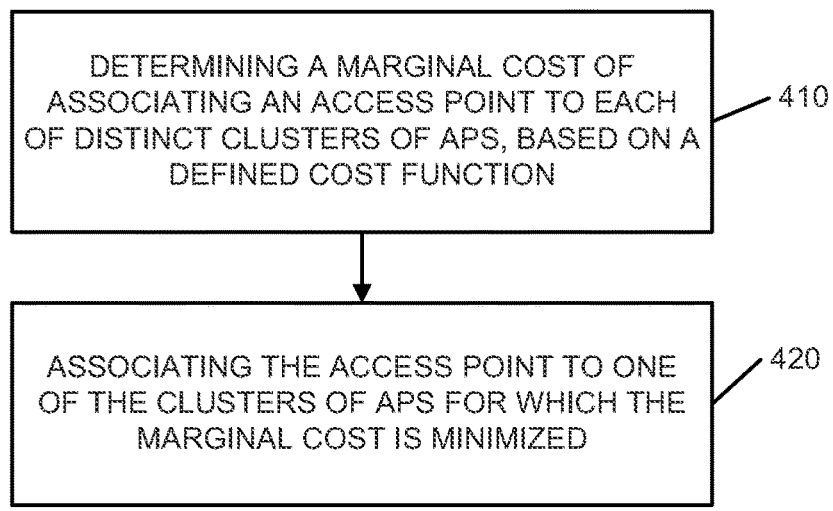
FIGS. 4-8 are flow charts illustrating aspects of methods for participating in distributed clustering of network nodes of a wireless communications system.

FIG. 4 is a flow diagram summarizing aspects of a method 400, by one or more access points of a wireless communication network participating in a distributed clustering process directed at defining clusters of access points (APs) wherein each of the clusters comprises a cluster head (CH) and associated member nodes. The method 400 may include, at 410, determining a marginal cost of associating an access point to each of distinct clusters of APs, based on a defined cost function. The method may further include, at 420, associating the access point to one of the clusters of APs for which the marginal cost is minimized. Each of the operation 410 and 420 may be performed by each and every access point participating in the clustering process, without intervention by a core network node, and without access to predetermined information defining the respective proximities of the access points to each other, under the chosen cost function.

The method 400 may further include additional operations or execution of algorithms, for example, one or more of operations 500, 600, 700 or 800 illustrated in FIGS. 5-8. Any one of these operations may be included as part of method 400, without necessarily requiring other upstream or downstream operations to also be included. Operations are grouped into different figures merely for illustrative convenience, and useful applications of the concepts disclosed herein are not limited to the illustrated groupings.

Figure 5:
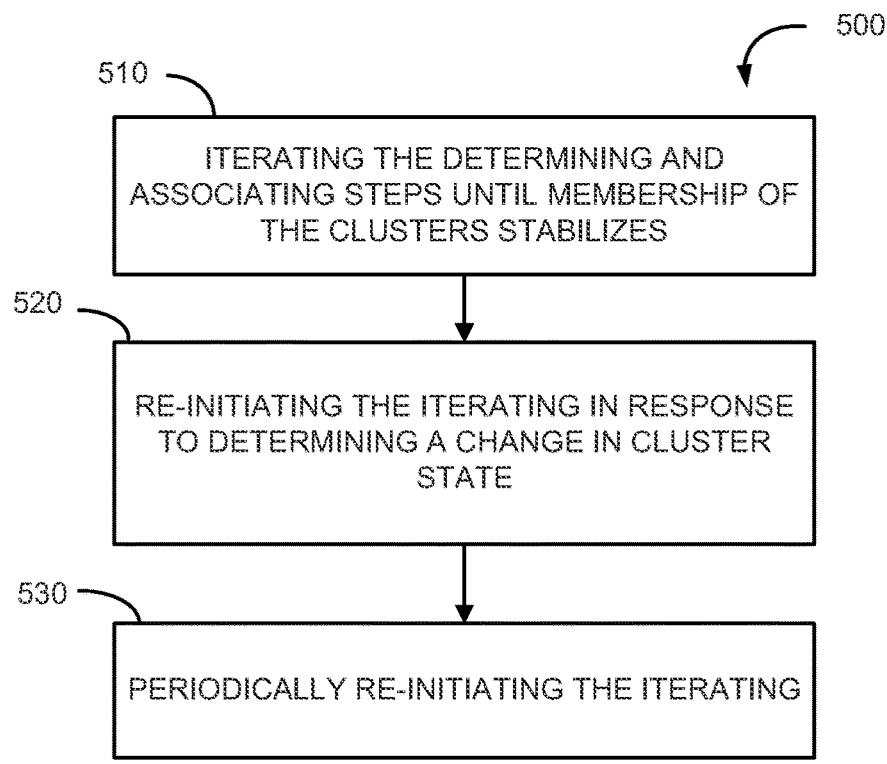

The method 400 may include one or more of the additional operations 500, shown in FIG. 5. The method 400 may include, at 510, iterating the determining and associating steps until membership, and/or CH identity, of the clusters stabilizes. Stability may be detected using one or more thresholds applied to changes between iteration cycles; for example, if cluster membership changes by less than a threshold amount between a specified number of iterations, the iterations may be terminated. Cluster formation and cluster head (CH) selection may use the same, or different, thresholds for stabilization of an iteration cycle. The method 400 may further include, at 520, re-initiating the iterating process until a new stable solution is obtained, in response to determining a change in cluster state, for example, when an access point in the cluster is activated or de-activated, or the value of the cost function changes by more than a threshold amount. In related aspects, cluster formation and cluster head (CH) selection may use the same, or different, thresholds for triggering the initiation of an iteration cycle. In the alternative, or in addition, the method may include, at 530, periodically re-initiating the iterating process.

Figure 6:
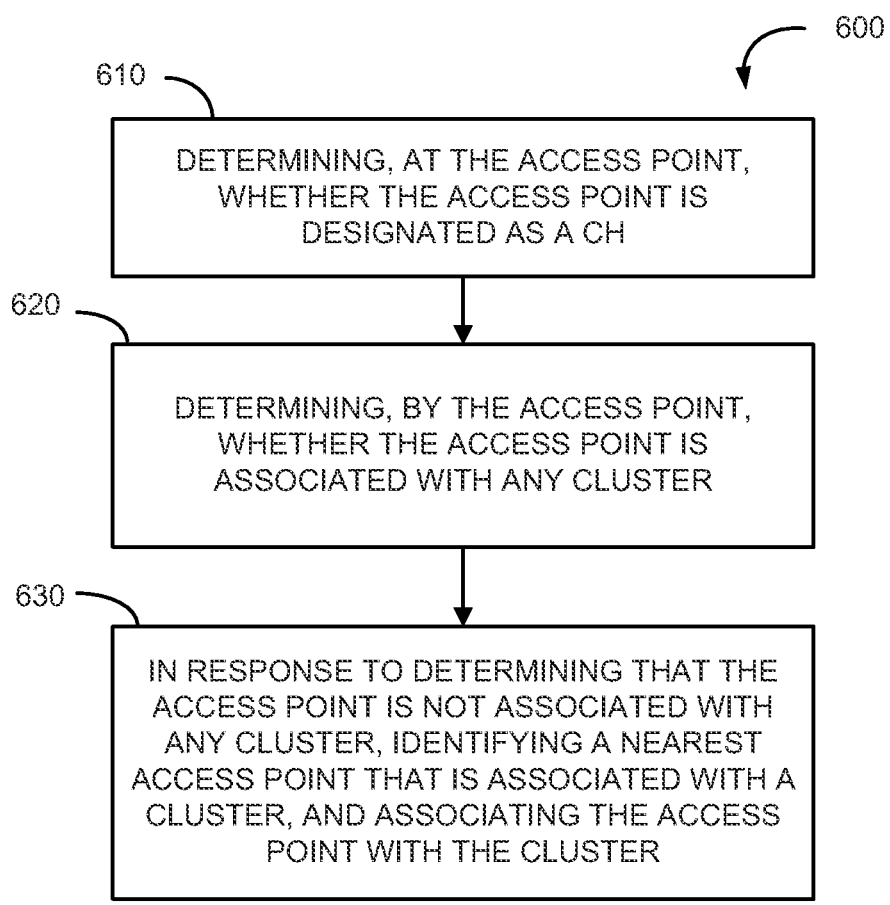

In other aspects, the method 400 may include one or more of the additional operations 600, shown in FIG. 6. The method 400 may further include, at 610, determining at the access point whether the access point is designated as a CH. For embodiments wherein the access point is not designated as a CH for a cluster, the method 400 may further include, at 620, determining by the access point whether the access point is associated with any cluster. In such embodiments, the method 400 may further include, at 630, in response to determining that the access point is not associated with any cluster, identifying a nearest access point that is associated with a cluster, and associating the access point with the cluster.

Figure 7:
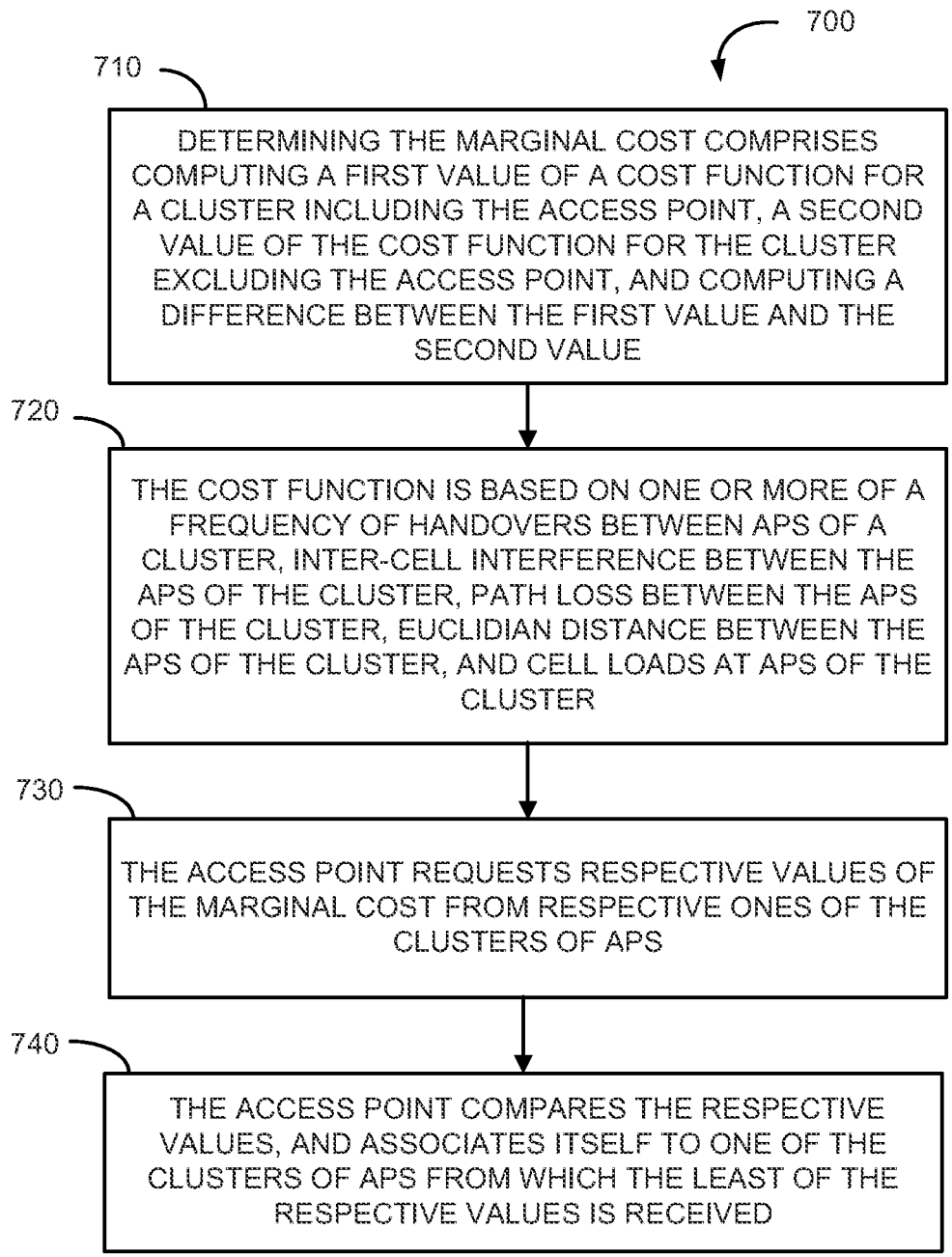

In other aspects, the method 400 may include one or more of the additional operations 700, shown in FIG. 7. Determining the marginal cost in the method 400 may include, at 710, computing a first value of a cost function for a cluster including the access point, a second value of the cost function for the cluster excluding the access point, and computing a difference between the first value and the second value. In an aspect illustrated at 720, the cost function may be based on one or more of a frequency of handovers between APs of a cluster, inter-cell interference between the APs of the cluster, path loss between the APs of the cluster, Euclidian distance between the APs of the cluster, and cell loads at APs of the cluster.

In another aspect of the method 400, at 730, the access point may request respective values of the marginal cost from respective ones of the clusters of APs. In addition, at 740, the access point may compare the respective values, and associate itself to one of the clusters of APs from which the least of the respective values is received.

Figure 8:
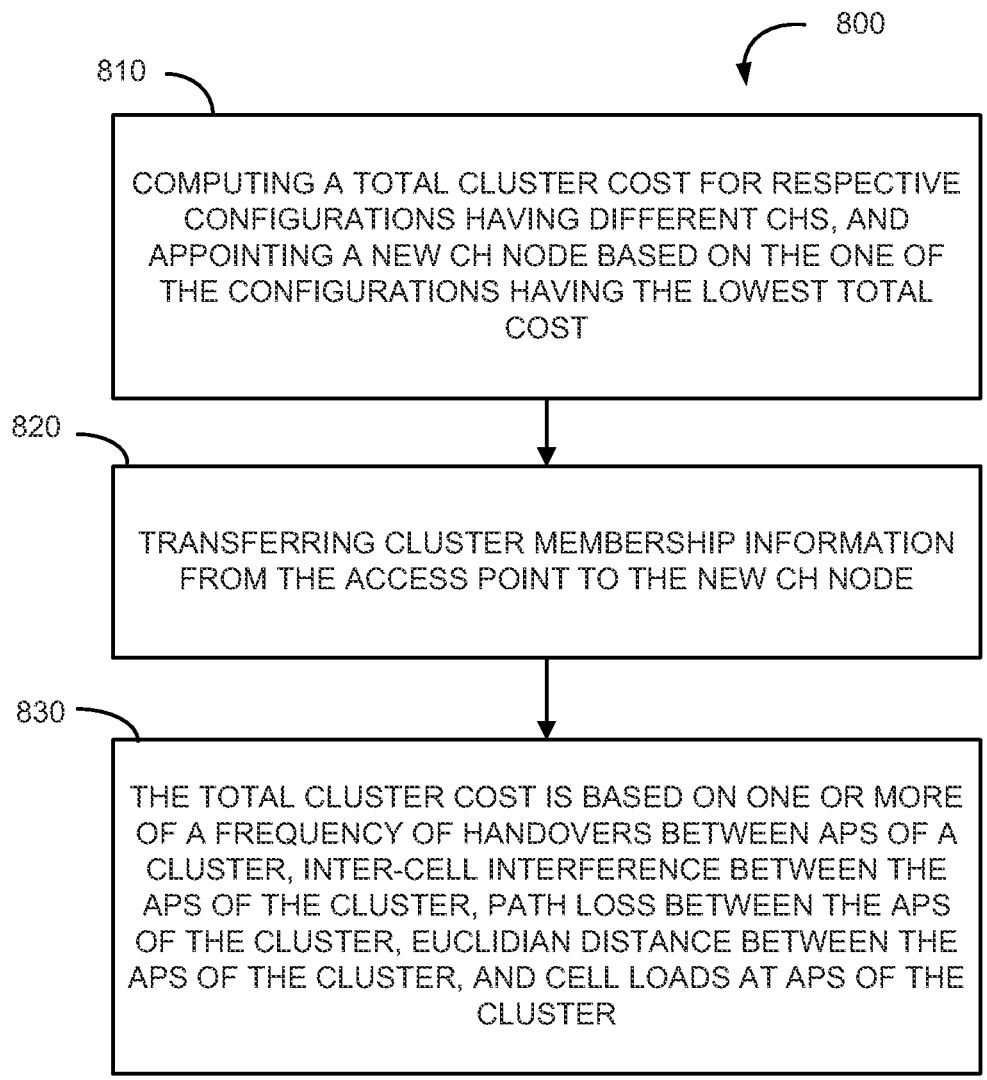

In other aspects, the method 400 may include one or more of the additional operations 800, shown in FIG. 8. In embodiments wherein the access point is designated as a CH for a cluster, the method 400 may further include, at 810, computing a total cluster cost for respective configurations having different CHs, and appointing a new CHI node based on the one of the configurations having the lowest total cost. In such embodiments, the method 400 may further include, at 820, transferring cluster membership information from the access point to the new CH node. As with the marginal cost function, the total cluster cost, at 830, may be based on one or more of a frequency of handovers between APs of a cluster, inter-cell interference between the APs of the cluster, path loss between the APs of the cluster, Euclidian distance between the APs of the cluster, and cell loads at APs of the cluster. Further details of cost functions as described herein above may likewise apply.

Figure 9:
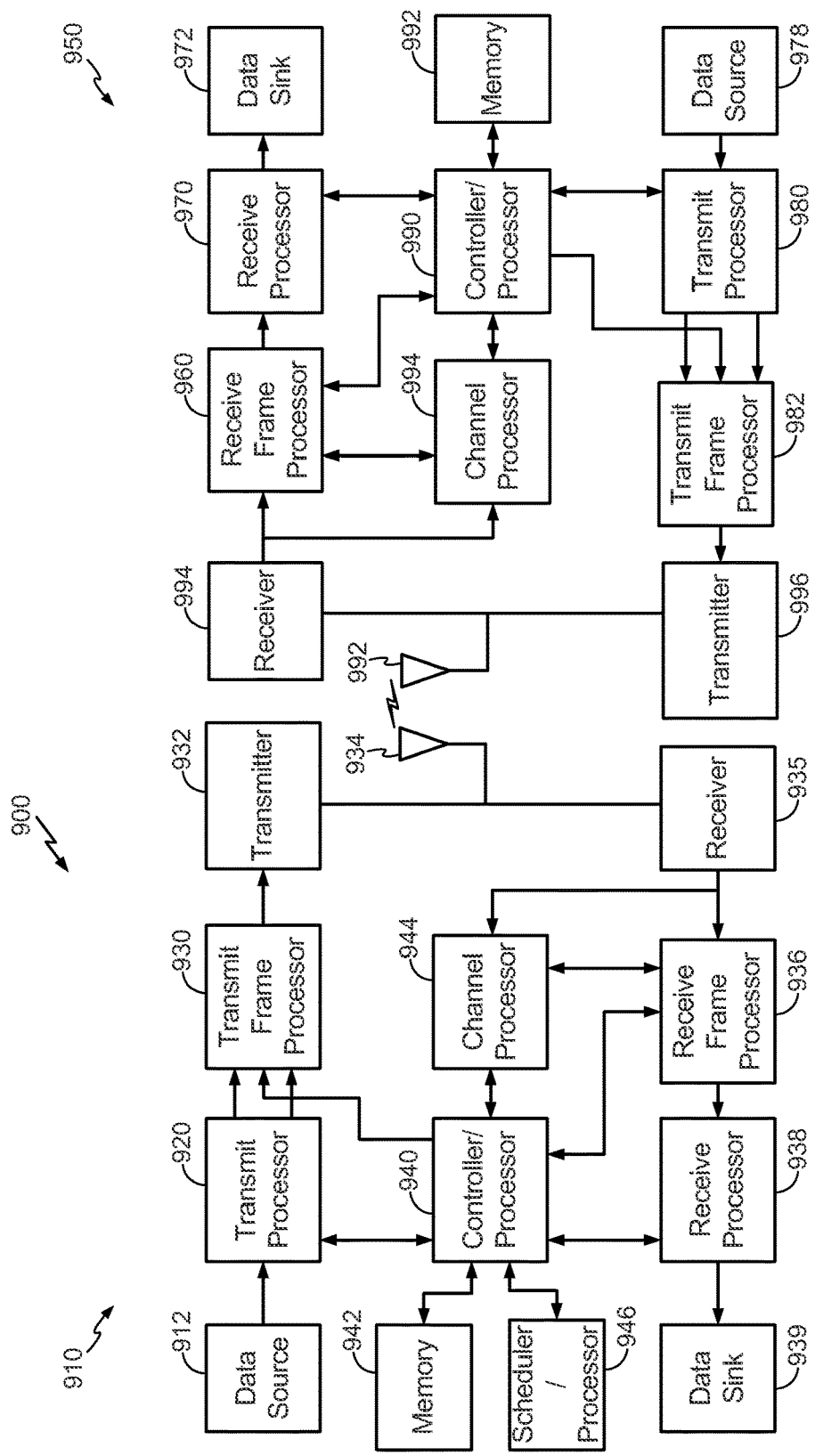
FIG. 9 is a block diagram illustrating aspects of a Node B in communication with a UE in a telecommunications system, wherein the Node B is configured for participating in distributed clustering of network nodes of a wireless communications system.

FIG. 9 is a block diagram of a Node B 910 in communication with a UE 950, where the Node B 910 may be a small cell such as node 102 in FIG. 1A, or any of the access point in the set of nodes 300 shown in FIGS. 3A-E, such as may participate in a distributed clustering process. The UE 950 may not participate in clustering, but is described for technical context. However, if operating as an access point, the UE 950 may also participate in clustering, in a manner as described for non-UE access points herein. Furthermore, access points may communicate with one another in a manner similar to communications between the Node B 910 and the UE 950, albeit adapted for peer-to-peer communications. The Node B 910 may communication with other Node Bs/access points using other wired or wireless communication modes or interfaces, also.

In the downlink communication, a transmit processor 970 may receive data from a data source 912 and control signals from a controller/processor 940. The transmit processor 970 provides various signal processing functions for the data and control signals, as well as reference signals (e.g., pilot signals). For example, the transmit processor 970 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 970. These channel estimates may be derived from a reference signal transmitted by the UE 950 or from feedback from the UE 950. The symbols generated by the transmit processor 970 are provided to a transmit frame processor 980 to create a frame structure. The transmit frame processor 980 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 970 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the LIE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA7000, Evolution-Data Optimized (EV-DO), Ultra Mobile Broadband (UMB), IEEE 802.11 (Wi-Fi), IEEE 802.16 (WiMAX), IEEE 802.70, Ultra-Wideband (UWB), Bluetooth, and/or other suitable systems. The actual telecommunication standard, network architecture, and/or communication standard employed will depend on the specific application and the overall design constraints imposed on the system.

Figure 10:
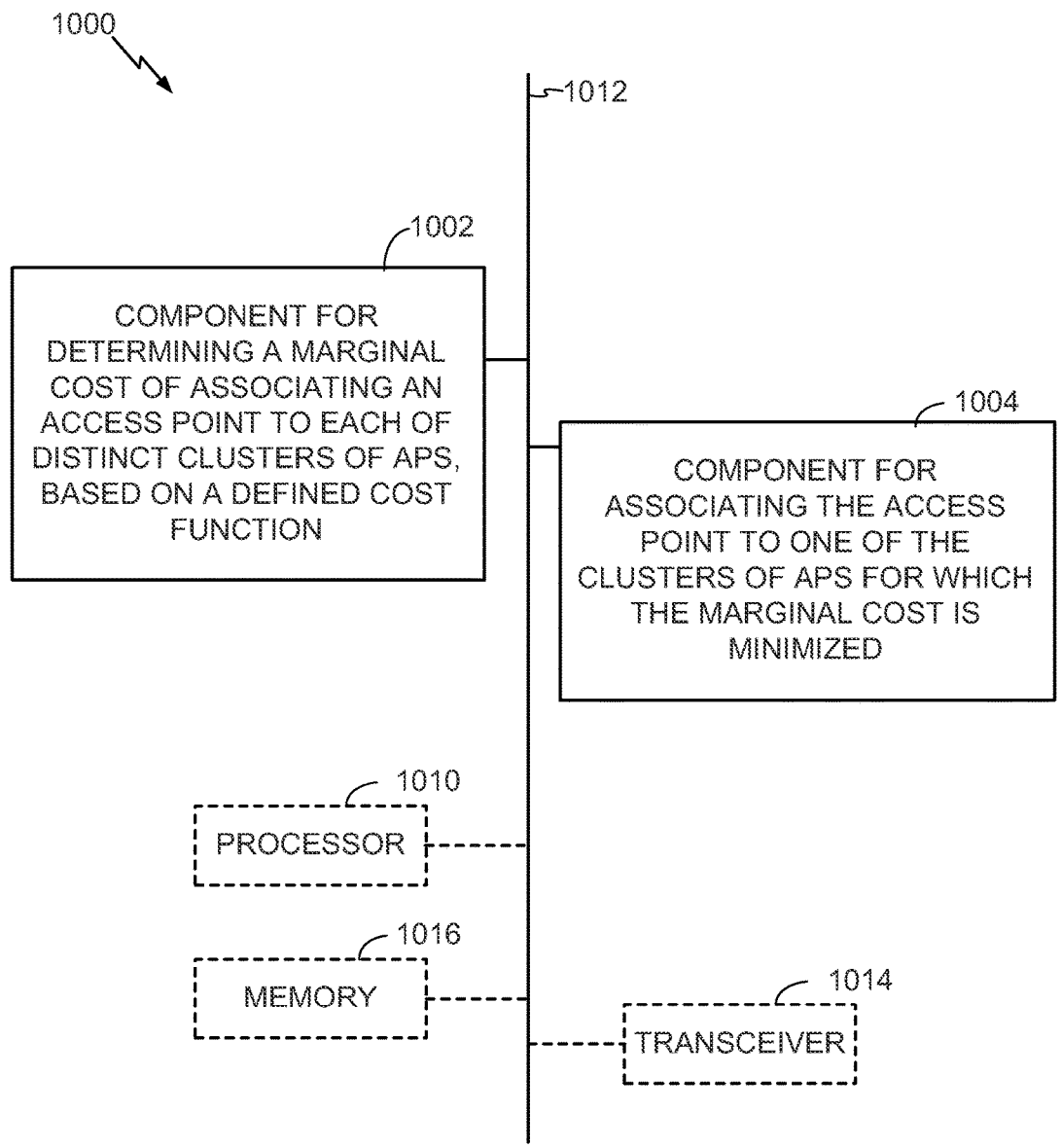
FIG. 10 is a block diagram illustrating further aspects of a Node B configured for participating in distributed clustering of network nodes of a wireless communications system.

For further example, with reference to FIG. 10, there depicted an apparatus 1000 that may be configured as a cell in a wireless network, or as a processor or similar device for use within the cell, disposed as an aggressor cell. The apparatus 1000 may include functional blocks that can represent functions implemented by a processor, software, hardware, or combination thereof (e.g., firmware).

As illustrated, in one embodiment, the apparatus 1000 may include an electrical component or module 1002 for determining a marginal cost of associating an access point to each of distinct clusters of APs, based on a defined cost function. For example, the electrical component 1002 may include at least one control processor coupled to a transceiver or the like and to a memory with instructions for determining the marginal cost. The component 1002 may be, or may include, a means for determining a marginal cost of associating an access point to each of distinct clusters of APs, based on a defined cost function. Said means may include the control processor executing any one or more of algorithms for computing a first value of a cost function for a cluster including the access point, a second value of the cost function for the cluster excluding the access point, and computing a difference between the first value and the second value, wherein the cost function is based on one or more of a frequency of handovers between APs of a cluster, inter-cell interference between the APs of the cluster, path loss between the APs of the cluster, Euclidian distance between the APs of the cluster, and cell loads at APs of the cluster.

The apparatus 1000 may include an electrical component 1004 for associating the access point to one of the clusters of APs for which the marginal cost is minimized. For example, the electrical component 1004 may include at least one control processor coupled to a transceiver or the like and to a memory holding instructions for the associating. The component 1004 may be, or may include, a means for associating the access point to one of the clusters of APs for which the marginal cost is minimized. Said means may include the control processor executing any one or more of algorithms for identifying a cluster having a minimal (lowest) marginal cost, identifying a cluster head of the lowest marginal cost cluster, and sending a message to the cluster head requesting, or providing notification of, addition of the access point to the cluster.

In related aspects, the apparatus 1000 may optionally include a processor component 1010 having at least one processor, in the case of the apparatus 1000 configured as a network entity. The processor 1010, in such case, may be in operative communication with the components 1002-1004 or similar components via a bus 1012 or similar communication coupling. The processor 1010 may effect initiation and scheduling of the processes or functions performed by electrical components 1002-1004. The processor 1010 may encompass the components 1002-1004, in whole or in part. In the alternative, the processor 1010 may be separate from the components 1002-1004, which may include one or more separate processors.

In further related aspects, the apparatus 1000 may include a radio transceiver component 1014. A stand alone receiver and/or stand alone transmitter may be used in lieu of or in conjunction with the transceiver 1014. In the alternative, or in addition, the apparatus 1000 may include multiple transceivers or transmitter/receiver pairs, which may be used to transmit and receive on different carriers. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for performing the activity of the components 1002-1004, and subcomponents thereof, or the processor 1010, or the methods disclosed herein. The memory component 1016 may retain instructions for executing functions associated with the components 1002-1004. While shown as being external to the memory 1016, it is to be understood that the components 1002-1004 can exist within the memory 1016.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, such as a custom application-specific integrated circuit (ASIC), and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be implemented in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is for purpose of example, and not for limitation. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for participating in a distributed clustering process directed at defining clusters of access points (APs) wherein each of the clusters comprises a cluster head (CH) and associated member nodes, the method comprising:
   determining a marginal cost of associating an access point to each of distinct clusters of APs, based on a defined cost function, the defining cost function including a scaling factor configured to emphasize or deemphasize individual APs, the scaling factor based at least on a number of users that are served by the AP;
   associating the access point to one of the clusters of APs for which the marginal cost is minimized;
   iterating the determining and associating until membership of the clusters stabilizes, and
   reinitiating the iterating of the determining and associating until membership of the clusters stabilizes in response to determining the marginal cost for at least one of the APs exceeds a threshold.

2. The method of claim 1, further comprising periodically re-initiating the iterating.

3. The method of claim 1, further comprising determining, at the access point, whether the access point is designated as a CH.

4. The method of claim 1, wherein the access point is not designated as a CH for a cluster, and further comprising determining, by the access point, whether the access point is associated with any cluster.

5. The method of claim 4, further comprising, in response to determining that the access point is not associated with any cluster, identifying a nearest access point that is associated with a cluster, and associating the access point with the cluster.

6. The method of claim 1, wherein determining the marginal cost comprises computing a first value of a cost function for a cluster including the access point, a second value of the cost function for the cluster excluding the access point, and computing a difference between the first value and the second value.

7. The method of claim 6, wherein the cost function is based on one or more of a frequency of handovers between APs of a cluster, inter-cell interference between the APs of the cluster, path loss between the APs of the cluster, Euclidian distance between the APs of the cluster, and cell loads at APs of the cluster.

8. The method of claim 6, wherein the access point requests respective values of the marginal cost from respective ones of the clusters of APs.

9. The method of claim 8, wherein the access point compares the respective values, and associates itself to one of the clusters of APs from which the least of the respective values is received.

10. The method of claim 1, wherein the access point is designated as a CH for a cluster, and further comprising computing a total cluster cost for respective configurations having different CHs, and appointing a new CH node based on the one of the configurations having the lowest total cost.

11. The method of claim 10, further comprising transferring cluster membership information from the access point to the new CH node.

12. The method of claim 10, wherein the total cluster cost is based on a combination of at least two of a frequency of handovers between APs of a cluster, inter-cell interference between the APs of the cluster, path loss between the APs of the cluster, Euclidian distance between the APs of the cluster, and cell loads at APs of the cluster.

13. An apparatus for participating in a distributed clustering process directed at defining clusters of access points (APs) wherein each of the clusters comprises a cluster head (CH) and associated member nodes, comprising a memory coupled to at least one processor, the memory holding instructions that when executed by the at least one processor, cause the apparatus to:
   determine a marginal cost of associating an access point to each of distinct clusters of APs, based on a defined cost function, the defining cost function including a scaling factor configured to emphasize or deemphasize individual APs, the scaling factor based at least on a number of users that are served by the AP;
   associate the access point to one of the clusters of APs for which the marginal cost is minimized;
   iterate the determining and associating until membership of the clusters stabilizes, and
   reinitiate the iterating of the determining and associating until membership of the clusters stabilizes in response to determining the marginal cost for at least one of the APs exceeds a threshold.

14. The apparatus of claim 13, wherein the memory holds further instructions for periodically re-initiating the iterating.

15. The apparatus of claim 13, wherein the memory holds further instructions for determining, at the access point, whether the access point is designated as a CH.

16. The apparatus of claim 13, wherein the access point is not designated as a CH for a cluster, and the memory holds further instructions for determining, by the access point, whether the access point is associated with any cluster.

17. The apparatus of claim 16, wherein the memory holds further instructions for, in response to determining that the access point is not associated with any cluster, identifying a nearest access point that is associated with a cluster, and associating the access point with the cluster.

18. The apparatus of claim 13, wherein the memory holds further instructions for determining the marginal cost at least in part by computing a first value of a cost function for a cluster including the access point, a second value of the cost function for the cluster excluding the access point, and computing a difference between the first value and the second value.

19. The apparatus of claim 18, wherein the cost function is based on one or more of a frequency of handovers between APs of a cluster, inter-cell interference between the APs of the cluster, path loss between the APs of the cluster, Euclidian distance between the APs of the cluster, and cell loads at APs of the cluster.

20. The apparatus of claim 18, wherein the memory holds further instructions for requesting respective values of the marginal cost from respective ones of the clusters of APs.

21. The apparatus of claim 20, wherein the memory holds further instructions for comparing the respective values, and associating itself to one of the clusters of APs from which the least of the respective values is received.

22. The apparatus of claim 13, wherein the access point is designated as a CH for a cluster, and wherein the memory hold further instructions for computing a total cluster cost for respective configurations having different CHs, and appointing a new CH node based on the one of the configurations having the lowest total cost.

23. The apparatus of claim 22, wherein the memory holds further instructions for transferring cluster membership information from the access point to the new CH node.

24. The apparatus of claim 22, wherein the total cluster cost is based on a combination of at least two of a frequency of handovers between APs of a cluster, inter-cell interference between the APs of the cluster, path loss between the APs of the cluster, Euclidian distance between the APs of the cluster, and cell loads at APs of the cluster.

25. A non-transitory computer-readable medium holding instructions for participating in a distributed clustering process directed at defining clusters of access points (APs) wherein each of the clusters comprises a cluster head (CH) and associated member nodes, that when executed by at least one processor, cause a computer to:
    determine a marginal cost of associating an access point to each of distinct clusters of APs, based on a defined cost function, the defining cost function including a scaling factor configured to emphasize or deemphasize individual APs, the scaling factor based at least on a number of users that are served by the AP;
    associate the access point to one of the clusters of APs for which the marginal cost is minimized;
    iterate the determining and associating until membership of the clusters stabilizes, and
    reinitiate the iterating of the determining and associating until membership of the clusters stabilizes in response to determining the marginal cost for at least one of the APs exceeds a threshold.

26. An apparatus for participating in a distributed clustering process directed at defining clusters of access points (APs) wherein each of the clusters comprises a cluster head (CH) and associated member nodes, the apparatus comprising:
    means for determining a marginal cost of associating an access point to each of distinct clusters of APs, based on a defined cost function, the defining cost function including a scaling factor configured to emphasize or deemphasize individual APs, the scaling factor based at least on a number of users that are served by the AP;
    means for associating the access point to one of the clusters of APs for which the marginal cost is minimized;
    means for iterating the determining and associating until membership of the clusters stabilizes, and
    means for reinitiating the iterating of the determining and associating until membership of the clusters stabilizes in response to determining the marginal cost for at least one of the APs exceeds a threshold.

27. The method of claim 10, wherein the total cluster cost is based on a combination of a frequency of handovers between APs of a cluster, inter-cell interference between the APs of the cluster, path loss between the APs of the cluster, Euclidian distance between the APs of the cluster, and cell loads at APs of the cluster.

28. The method of claim 1, wherein the membership of the clusters stabilizes when the membership changes by less than a threshold amount between a particular number of iterations.

* * * * *